United States Patent
Le Blanc, Sr.

[15] 3,660,778
[45] May 2, 1972

[54] LASER BEAM FOLDING DEVICE

[72] Inventor: Leo J. Le Blanc, Sr., 1116 Cypress Lake Drive, Fort Myers, Fla. 33901

[22] Filed: June 16, 1970

[21] Appl. No.: 46,755

[52] U.S. Cl. ................................................. 331/94.5
[51] Int. Cl. ................................................... H01s 3/08
[58] Field of Search ...................................... 331/94.5

[56] References Cited

UNITED STATES PATENTS

| 3,383,621 | 5/1968 | Luck, Jr. et al. | 331/94.5 |
| 3,356,966 | 12/1967 | Miller | 331/94.5 |
| 3,404,349 | 10/1968 | Rigrod | 331/94.5 |
| 3,289,101 | 11/1966 | Masters et al. | 331/94.5 |
| 3,277,396 | 10/1966 | Statz et al. | 331/94.5 |

*Primary Examiner*—William L. Sikes
*Attorney*—Clarence A. O'Brien and Harvey B. Jacobson

[57] ABSTRACT

The resonant cavity of anionized gas laser device is elongated by conducting a laser beam between internal reflectors along a plurality of parallel plasma tubes located between beam folding reflectors in a gas discharge region. The plasma tubes are cooled by a circulating coolant and the length of the resonant cavity is adjustable adjacent to the internal reflectors.

12 Claims, 7 Drawing Figures

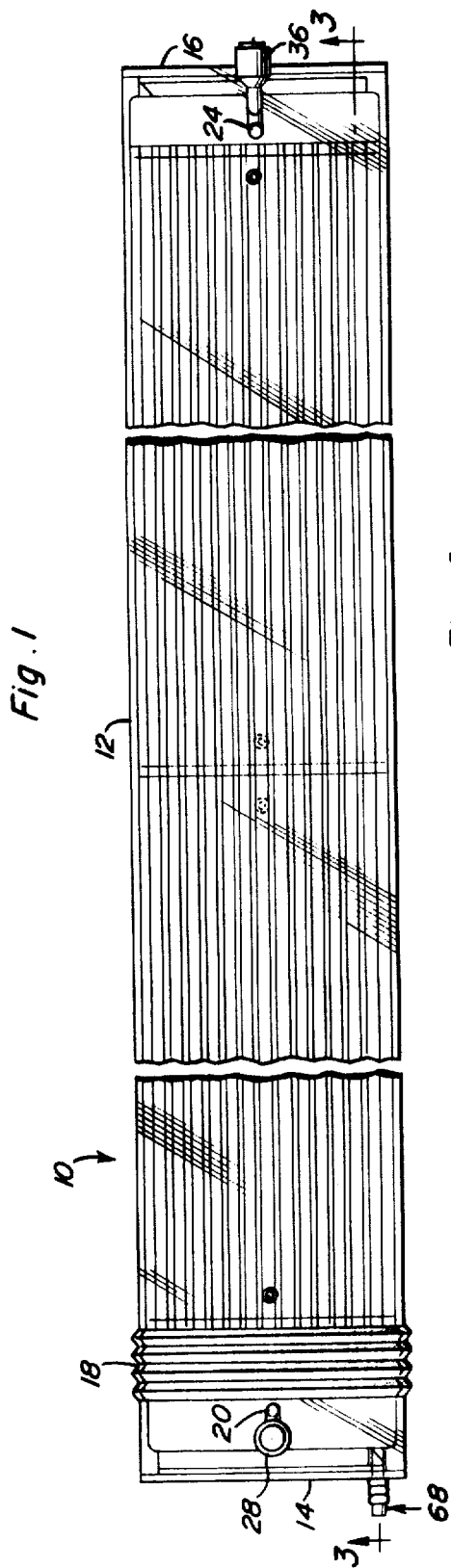
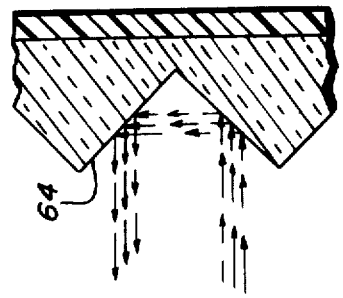
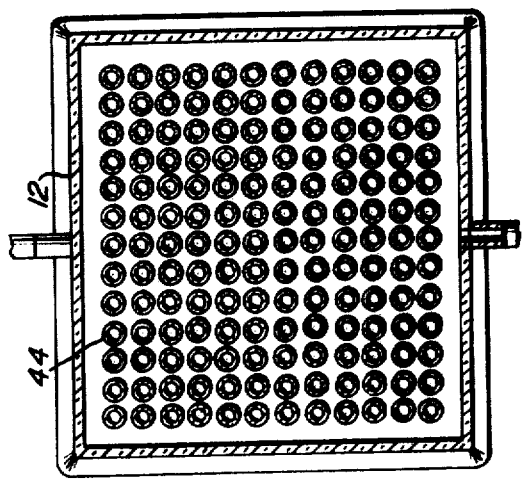
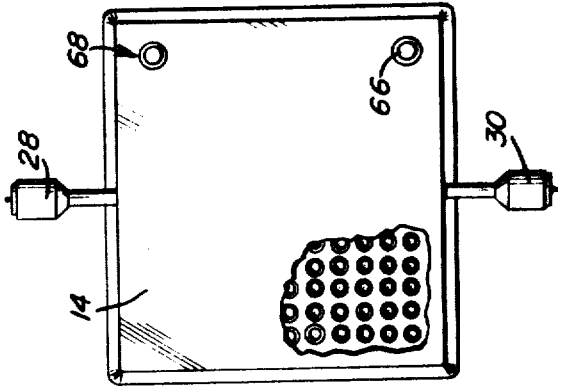
Leo J. LeBlanc, Sr.
INVENTOR.

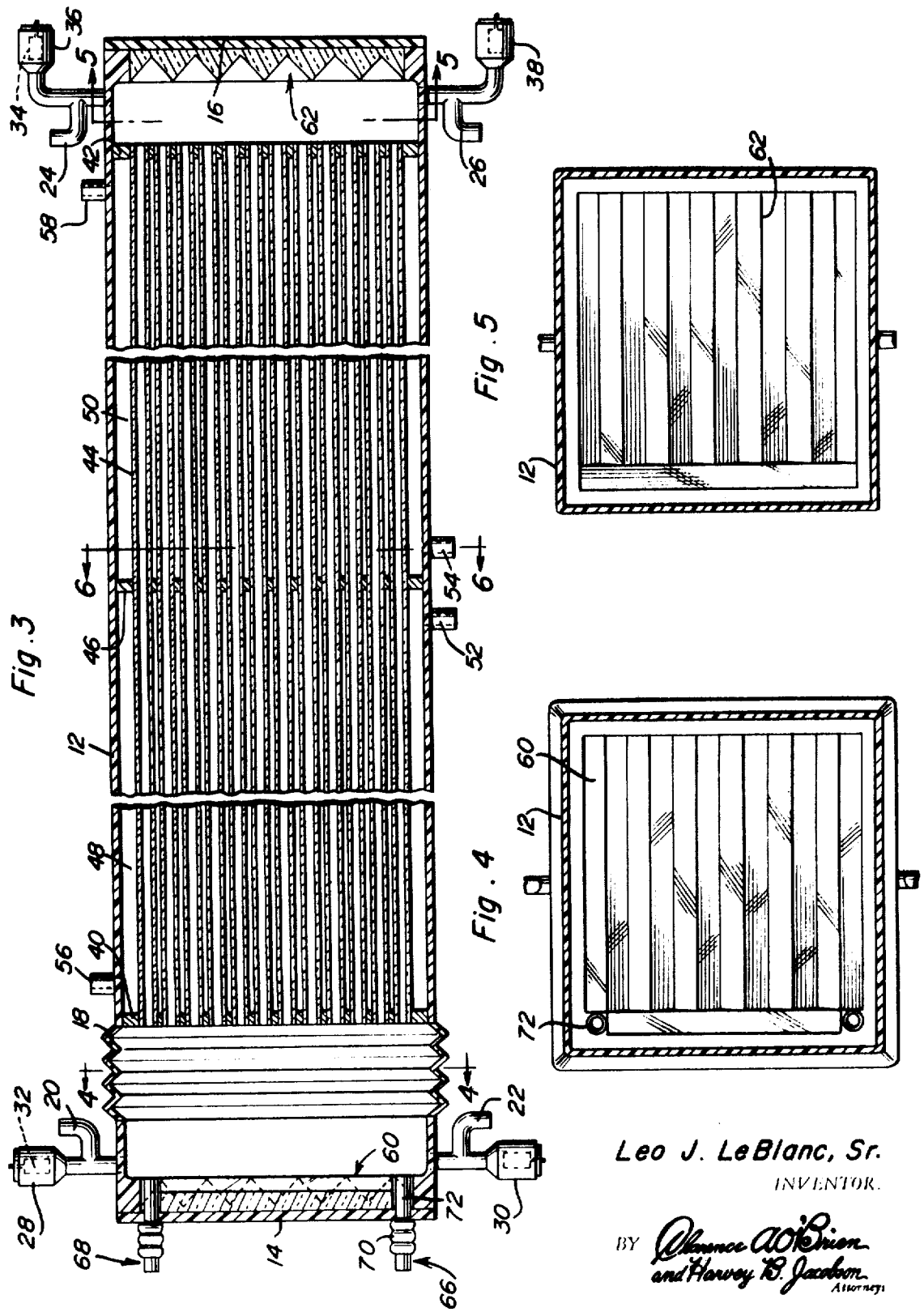

LASER BEAM FOLDING DEVICE

This invention relates to laser beam generators in general and more particularly to a high power, ionized gas laser.

It is commonly known that the output power of a laser is approximately proportional to the length of the discharge region. Thus, space limitations and heat dissipation problems has limited the construction of a laser with a high output power. It is therefore an important object of the present invention to provide a laser generator construction that is relatively small and yet has a high power output comparable to more massive laser generators.

In accordance with the present invention, a laser beam is generated within a gas mixture type of host medium and a prolonged optical resonant cavity is established therein by folding of the laser beam through the use of reflector matrices at the opposite axial ends of the laser housing. The beam accordingly travels through a large number of transitions, each time gathering more photon density and power. A multi-plasma tube assembly is positioned within the laser housing for accommodating the travel of the beam along a plurality of narrow paths through a cooling region. Flexible bellows are employed for adjusting the overall length of the system and electrodes connected to a standard variable d.c. voltage supply, establish the discharge region within the gas mixture between the end optical matrices. Internal reflectors at one end of the laser housing form the ends of the active resonant cavity between which the folded beam travels.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a top plan view of the laser device constructed in accordance with the present invention.

FIG. 2 is an end view of the device shown in FIG. 1 with a portion broken away.

FIG. 3 is an enlarged partial sectional view taken substantially through a plane indicated by section line 3—3 in FIG. 1.

FIG. 4 is a transverse sectional view taken substantially through a plane indicated by section line 4—4 in FIG. 3.

FIG. 5 is a transverse sectional view taken substantially through a plane indicated by section line 5—5 in FIG. 3.

FIG. 6 is a transverse sectional view taken substantially through a plane indicated by section line 6—6 of FIG. 3.

FIG. 7 is an enlarged partial sectional view of one of the end optical matrices associated with the device of the present invention.

Referring now to the drawings in detail, the laser device generally denoted by reference numeral 10 in FIG. 1 includes an elongated housing or body 12 made of a suitable material such as plastic and is tubular in cross-section to enclose a host medium in the form of a gaseous mixture adapted to be either circulated therethrough or sealed therewithin. The tubular body 12 is closed by end walls 14 and 16 at opposite ends. A bellows formation 18 forms part of the housing adjacent one end wall 14 in order to accommodate axial adjustment of the length of the system.

Referring now to FIG. 3 in particular, a pair of inlet tubes 20 and 22 are connected to the housing adjacent the end wall 14 through which the gas mixture is introduced. Outlet tubes 24 and 26 are connected to the housing adjacent the other end wall 16. Although various types of gas mixtures may be utilized, in order to obtain optimum performance in one embodiment of the invention a mixture of carbon dioxide with additives of helium and nitrogen is suggested in order to develop laser oscillations of 10.6 microns wavelength. As is well known in the art, the laser oscillations are produced by establishing an electrical energy field by applying d.c. voltage to electrodes between which a gas discharge region is formed. In the illustrated embodiment as shown in FIG. 3, electrode supports 28 and 30 are connected to the inlet tubes 20 and 22 in order to expose the interior of the housing to a pair of electrodes 32 of one polarity connected to a d.c. source. Electrodes 34 of the opposite polarity are mounted by electrode supports 36 and 38 adjacent the other end wall 16 of the housing for exposure to the interior of the housing at the location of the outlet tubes 24 and 26. The electrodes may be formed from barium coated iron or other suitable materials capable of withstanding high voltage and current conditions.

Fixedly mounted within the tubular body or housing 12 are a pair of end partitian plates 40 and 42 supporting the ends of a plurality of parallel spaced plasma tubes 44 filled with the gas mixture and through which a laser beam travels. The plasma tubes are of capillary dimension such as 50 mm inside diameter. The tubes are also supported intermediate their ends by a partition support plate 46 also dividing the interior of the housing between the end plates 40 and 42 into two cooling zones 48 and 50. A coolant such as water is accordingly introduced into the cooling zones 48 and 50 through inlets 52 and 54 located adjacent to and on opposite sides of the intermediate partition plate 46. Coolant outlets 56 and 58 are connected to the cooling zones adjacent the end plates 40 and 42. Accordingly, a supply of coolant may be circulated through the cooling zones 48 and 50 for heat dissipation purposes.

In the illustrated embodiment, 156 plasma tubes 44 establish narrow optical paths for a laser beam within a high gain discharge region, the laser beam being folded at the opposite axial ends of the housing 12 by means of optical reflector matrices 60 and 62 positioned at the end walls 14 and 16 of the housing. Each of the matrices is formed by a plurality of pre-calibrated corner reflectors 64 as more clearly seen in FIG. 7 designed to reverse the direction of the light beam in the system. This produces the "folding" effect and thereby increases the effective length of the laser system. Each reflector matrix may be constructed as one solid and non-adjustable component by pouring molten glass into a precalibrated mold. The component is then coated with a multi-layer dielectric that has an optimum reflectivity at the wavelength of laser oscillation for the gas mixture.

The laser beam travels between two internal reflectors 66 and 68 mounted on the end wall 14 at one longitudinal end of the housing 12 as more clearly seen in FIG. 3. These internal reflectors form part of the optical resonant cavity of the laser device and each has a spherical reflector surface with a radius of curvature approximately equal to the overall length of the system. External adjustments for each of the reflectors is accommodated by bellow formations 70 interconnecting the reflectors with the access tubes 72 through which the laser beam travels. The reflector 66 in addition to being optically spherical, is coated with a highly reflective coating similar to the coating applied to the beam folding matrices 60 and 62 for total or optimum reflectivity at the wavelength of laser oscillation. The reflector 68 on the other hand is arranged to have a somewhat reduced reflectivity such as 99 to 90 percent of that of the reflector 66 and thereby constitutes an output reflector through which a pulsed laser beam passes.

It should be appreciated that the gas mixture utilized may be changed, in which case the reflectors would have to be altered accordingly. The reflectors and other light transmissive parts are made of a lower expansion type glass such as quartz or the zero expansion glass known as "Cer-Vit." The laser housing 12 and the bellows 18 and 70 will be made of a suitable heat resistant material. The bellows 18 is employed for adjustment of the optical matrices and for minor adjustments of the overall length of the system while the bellows 70 accommodate adjustment of the active reflectors 66 and 68. The gas mixture within the laser device may be pumped into the system through the inlets 20 and 22 and sealed therein. Alternatively, the gas mixture may be circulated through the system between the inlets 20 and 22 and the outlets 24 and 26.

The foregoing is considered as illustrative only of the principles of the invention. Further, since numerous modifications and changes will readily occur to those skilled in the art, it is not desired to limit the invention to the exact construction and operational shown and described, and accordingly all suitable modifications and equivalents may be resorted to, falling within the scope of the invention as claimed.

What is claimed as new is as follows:

1. An optical laser comprising an elongated housing having opposite end portions containing a gaseous host medium and an intermediate cooling region, partition means separating the cooling region from the end portions, a pair of internal reflectors mounted in spaced relation to each other in one of said end portions, beam folding means mounted at both of said end portions for establishing an elongated optical resonant cavity between said pair of internal reflectors, a plurality of capillary tubes supported within the cooling region establishing fluid communication between the end portions and an optical path between the beam folding means, one of said pair of internal reflectors and the beam folding means having optimum reflectivity at the wavelength of laser oscillation and the other of said pair of internal reflectors having a relatively reduced reflectivity at said wavelength whereby a pulsed output beam is transmitted therethrough.

2. The combination of claim 1 including electrode means mounted adjacent said end portions for establishing a plasma discharge region within the capillary tubes.

3. The combination of claim 2 wherein each of said internal reflectors has a spherical surface with a radius of curvature substantially equal to the length of the resonant cavity.

4. The combination of claim 3 including means for axially adjusting the length of the housing adjacent one of the ends thereof.

5. The combination of claim 4 including means for circulating coolant through the cooling region in heat transfer relation to the capillary tubes.

6. The combination of claim 1 wherein each of said internal reflectors has a spherical surface with a radius of curvature substantially equal to the length of the resonant cavity.

7. The combination of claim 1 including means for axially adjusting the length of the housing adjacent one of the ends thereof.

8. The combination of claim 1 including means for circulating coolant through the cooling region in heat transfer relation to the capillary tubes.

9. In an optical laser, an elongated housing enclosing a plasma discharge region, beam folding means mounted by the housing in axially spaced relation to each other, and means for establishing an optical path between said beam folding means to form an elongated resonant cavity, including a plurality of spaced capillary tubes within the plasma discharge region, and means supporting the tubes within a cooling region axially spaced from the beam folding means.

10. The combination of claim 9 including a total internal reflector and an output reflector mounted adjacent one of the beam folding means to form part of the resonant cavity.

11. The combination of claim 10 including means for axially adjusting the length of the resonant cavity adjacent one of the beam folding means.

12. The combination of claim 9 including means for axially adjusting the length of the resonant cavity adjacent one of the beam folding means.

* * * * *